United States Patent
Park et al.

(10) Patent No.: US 8,868,292 B2
(45) Date of Patent: Oct. 21, 2014

(54) APPARATUS FOR CONTROLLING INTERIOR TEMPERATURE OF A VEHICLE AND METHOD THEREOF

(75) Inventors: Heung In Park, Gyeonggi-do (KR); Chi Nam Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 132 days.

(21) Appl. No.: 13/070,277

(22) Filed: Mar. 23, 2011

(65) Prior Publication Data
US 2012/0116608 A1 May 10, 2012

(30) Foreign Application Priority Data
Nov. 10, 2010 (KR) .................. 10-2010-0111739

(51) Int. Cl.
- G05D 23/00 (2006.01)
- H04W 4/20 (2009.01)
- B60H 1/00 (2006.01)
- H04W 4/04 (2009.01)

(52) U.S. Cl.
CPC ............ *H04W 4/20* (2013.01); *B60H 1/00807* (2013.01); *B60H 1/00657* (2013.01); *H04W 4/046* (2013.01)
USPC .............................. 701/36; 701/2

(58) Field of Classification Search
CPC .... H04W 4/20; H04W 4/046; B60H 1/00807; G60H 1/00657
USPC ..................................... 701/2, 36
See application file for complete search history.

(56) References Cited

U.S. PATENT DOCUMENTS

| 6,693,535 | B2* | 2/2004 | Van Bosch et al. ........ 340/539.1 |
| 7,542,827 | B2 | 6/2009 | Gerard et al. |
| 2002/0109583 | A1* | 8/2002 | Losey .......................... 340/5.72 |
| 2002/0194856 | A1* | 12/2002 | Yeo ................................. 62/179 |
| 2003/0093199 | A1* | 5/2003 | Mavreas .......................... 701/33 |
| 2006/0075766 | A1* | 4/2006 | Ziehr et al. ...................... 62/186 |
| 2010/0072290 | A1* | 3/2010 | Dage ............................... 236/51 |
| 2010/0106363 | A1* | 4/2010 | Mandujano .................... 701/36 |
| 2010/0235046 | A1* | 9/2010 | Proefke et al. ................. 701/36 |

FOREIGN PATENT DOCUMENTS

| JP | 2004-256092 A | 9/2004 |
| JP | 2006-021659 A | 1/2006 |
| KR | 10-2000-0025483 A | 5/2000 |
| KR | 1020030043083 | 6/2003 |

(Continued)

OTHER PUBLICATIONS

Remote start—its not just for automatic transmissions any more! (Sep. 20, 2007). PR Newswire Retrieved from http://search.proquest.com/professional/docview/674218252?accountid=142257.*

*Primary Examiner* — Scott Zare
(74) *Attorney, Agent, or Firm* — Edwards Wildman Palmer LLP; Peter F. Corless

(57) ABSTRACT

Provided is an apparatus for controlling a vehicle interior temperature, which includes a storage means configured to store a temperature control table; a wireless transceiver means configured to receive a message from an external device and transmit a corresponding response message; a message analysis means configured to analyze the message received by the wireless transceiver means; a control means configured to identify a current vehicle interior temperature and control the vehicle interior temperature based on the temperature control table until the vehicle interior temperature reaches a target temperature by communicating with a vehicle controller through an association means, when the message analyzed by the message analysis means is a temperature control message; and the association means configured to associate the control means with the vehicle controller.

5 Claims, 3 Drawing Sheets

(56) References Cited

FOREIGN PATENT DOCUMENTS

| KR | 1020070020653 | 2/2007 |
| KR | 1020070066201 | 6/2007 |
| KR | 10-2010-0021943 A | 2/2010 |

* cited by examiner

APPARATUS FOR CONTROLLING INTERIOR TEMPERATURE OF A VEHICLE AND METHOD THEREOF

CROSS-REFERENCES TO RELATED APPLICATIONS

Priority to Korean patent application number 10-2010-0111739, filed on Nov. 10, 2010, which is hereby incorporated by reference in its entirety, is claimed.

BACKGROUND OF THE INVENTION

1. Field of the Invention

The present invention relates to an apparatus and a method for controlling an interior temperature of a vehicle, and more particularly, to an apparatus and a method for controlling an interior temperature of a vehicle in association with various controllers of the vehicle, in response to a remote control signal.

2. Description of the Related Art

Generally, a vehicle includes an engine controller for controlling a running state of an engine, an air conditioning controller for controlling an air conditioner and a heater, and a body controller for controlling a window, a sunroof, and a seat heater.

During the winter time, a driver who enters the vehicle experiences discomfort due to cold air in the vehicle. To solve this problem, a remote vehicle starting apparatus can be used. The remote vehicle starting apparatus starts the vehicle by wirelessly transmitting a start command to the engine controller, which controls engine starting, from a remote location. When the engine is started, a heater which is previously set before the driver leaves the vehicle is operated to increase a vehicle's interior temperature. Likewise, during the summer time, when the engine is started, an air conditioner which is previously set before the driver leaves the vehicle is operated to lower the vehicle's interior temperature.

Such vehicle interior temperature control methods, using the conventional remote vehicle starting apparatus, cannot control or enable any type of remote setting of the vehicle's interior temperature but merely turn on the heater or the air conditioner which is previously set to the one position or a specific temperature before the driver leaves the vehicle.

Also, in the conventional method, only the heater or the air conditioner which is previously set before the driver leaves the vehicle is turned on while for example the heated seats or the opening/closing of the window and the sunroof cannot be controlled. Thus, the vehicle interior temperature cannot be efficiently controlled to its maximum capabilities.

SUMMARY OF THE INVENTION

The present invention provides an apparatus and a method for controlling a vehicle interior temperature in association with various controllers of the vehicle in response to a remote control signal so that the vehicle interior temperature can be efficiently controlled to a driver's desired temperature in winter time as well as summer time.

In accordance with an embodiment of the present invention, provided is an apparatus for controlling a vehicle interior temperature. In particular, this apparatus may include a storage means that may be configured to store a temperature control table and a wireless transceiver means which may be configured to receive a message from an external device and transmit a corresponding response message. In addition, a message analysis means may be configured to analyze the message received by the wireless transceiver means and a control means may be configured to identify a current vehicle interior temperature and control the vehicle interior temperature based on the temperature control table until the vehicle interior temperature reaches a target temperature by communicating with a vehicle controller through an association means, when the message analyzed by the message analysis means is a temperature control message; and the association means configured to associate the control means with the vehicle controller.

In accordance with another aspect of the present invention, provided is an apparatus for controlling a vehicle interior temperature. In this embodiment of the present invention, a wireless transceiver means may be configured to receive a message from an external device and transmit a corresponding response message. Additionally, a message analysis means may be configured to analyze the message received by the wireless transceiver means, and a control means may be configured to set a temperature inserted in a temperature setting message as a target temperature when the message analyzed by the message analysis means is the temperature setting message.

In accordance with still another embodiment of the present invention, provided is a method of controlling a vehicle interior temperature in association with a vehicle controller. More specifically, the method analyzes messages received from an external, sets a corresponding temperature as a target temperature when an analysis result indicates that the message is a temperature setting message, identifies a current vehicle interior temperature, and, when the analysis result indicates that the message is a temperature control message controls the vehicle interior temperature based on a temperature control table until the vehicle interior temperature reaches the target temperature by communicating with the vehicle controller.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

Figure 1:
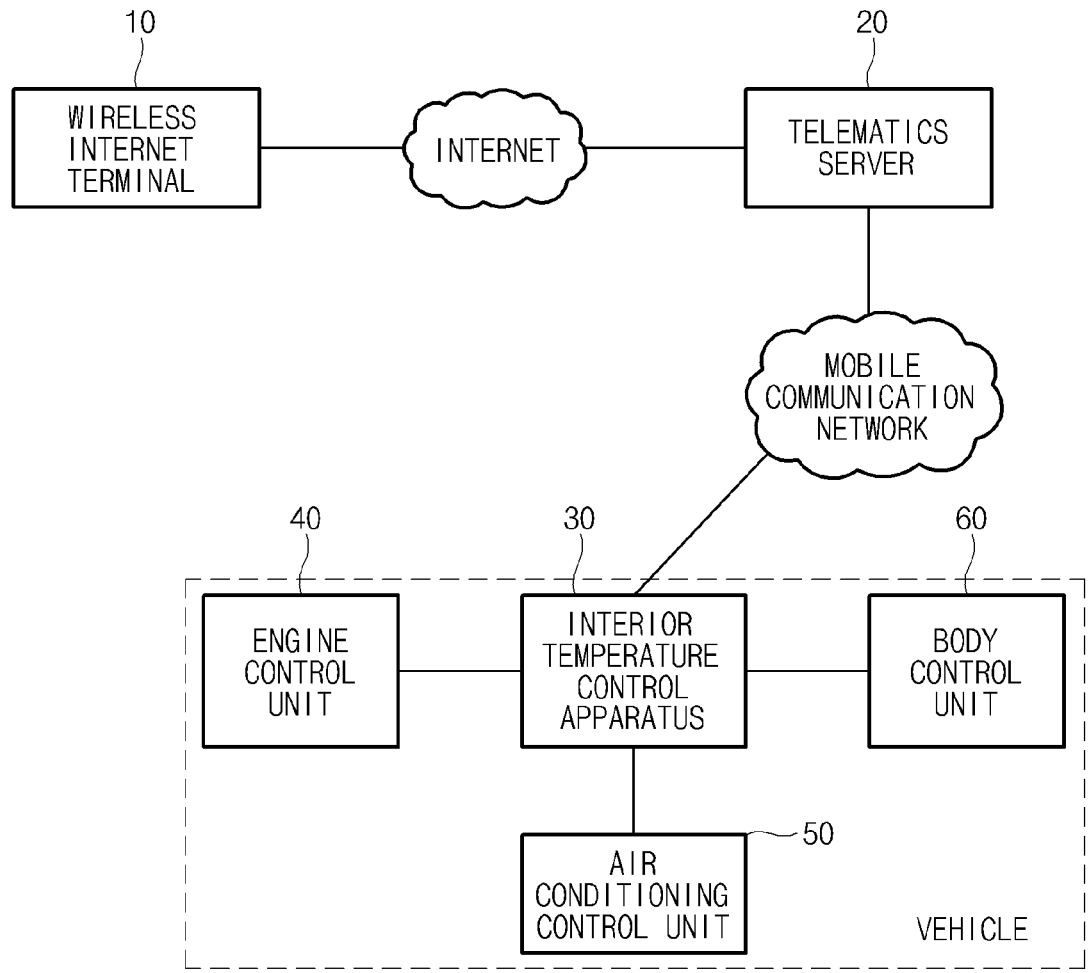
FIG. 1 is an exemplary diagrammatic illustrating a configuration of a system for controlling a vehicle interior temperature according to an exemplary embodiment of the present invention.

FIG. 1 is an exemplary diagrammatic illustrating a configuration of a system for controlling a vehicle interior temperature according to an exemplary embodiment of the present invention.

As shown in FIG. 1, the system for controlling a vehicle interior temperature according to an exemplary embodiment of the present invention includes a wireless internet terminal 10, a telematics server 20, an interior temperature control apparatus 30, an engine control unit 40, an air conditioning control unit 50, and a body control unit 60. For example, the air conditioning control unit 50 may, for example, be dual auto temperature control. Herein, the combination of the engine control unit 40, the air conditioning control unit 50 and the body control unit 60 can be referred to collectively as a vehicle controller.

The wireless internet terminal 10 may also include various terminals which can connect to the telematics server 20 through the internet via various communication methods such as WiBro or WiFi. For example, the wireless internet terminal 10 may be a smartphone that can support internet connection through WiFi. In order for a smartphone user to use a vehicle interior temperature control service according to the present invention, the user connects to the telematics server 20 to sign up to the service in advance. In addition, the user downloads and installs an application for which assists the user in requesting and validating the remote vehicle starting program, requesting and validating the vehicle's interior temperature setting, and requesting and validating the vehicle's interior temperature control.

Through the above procedure, once the application is installed on the smartphone, the user can conveniently set a desired temperature to remotely control a vehicle's interior temperature.

The telematics server 20 is connected to the smartphone through internet and connected to the vehicle interior temperature control apparatus 30 through a mobile communication network, for example a 3G network. The telematics server 20 may then transmit a request for the vehicle's interior temperature setting and a request for the vehicle's interior temperature control, which were received from the smartphone, to the interior temperature control apparatus 30 positioned within the vehicle. When the telematics server 20 then receives a performance result from the interior temperature control apparatus 30, and transmits the performance result to the smartphone. In some embodiments of the present invention, the interior temperature control apparatus 30 may be implemented as a module of a telematics terminal.

The interior temperature control apparatus 30 may set a target temperature based on a requested temperature when the request for the vehicle's interior temperature setting is received from the telematics server 20 through the mobile communication network.

Furthermore in the illustrative embodiments of the present invention, when a vehicle interior temperature control command is received from the telematics server 20 through the mobile communication network, the interior temperature control apparatus 30 identifies the vehicle's interior temperature. In addition, the interior temperature control apparatus 30, in communication with a corresponding controller, controls a corresponding device based on a temperature control table until the vehicle interior temperature reaches the target temperature which, for example, was entered by the user.

In other words, the interior temperature control apparatus 30 is associated with the engine controller 40, to control an engine starting of the vehicle, is associated with the air conditioning controller 50, to control an operation of an air conditioner, or a heater, and is associated with the body controller 60, to control opening/closing of a window and a sunroof and heating of a seat heater. In some embodiments of the present invention, when opening the window and the sunroof, the window or the sunroof may be configured to open or roll down no more than a certain extent to prevent a vehicle theft or theft of valuables placed within the vehicle by a stranger. Also, the window and the sunroof controlled or configured to not to be opened in a rainy weather, for example by equipping the vehicle with a rain sensor to detect rain.

The engine controller 40 controls the engine starting of the vehicle in response to a request from the interior temperature control apparatus 30 which is received through an association unit 35.

The air conditioning controller 50 controls the operation of the air conditioner or the heater in response to a request from the interior temperature control apparatus 30 which is received through the association unit 35.

The body controller 60 controls the opening/closing of the window and the sunroof and the heating of the seat heater in response to a request from the interior temperature control apparatus 30 which is received through the association unit 35.

Accordingly, the engine controller 40, the air conditioning controller 50 and the body controller 60 are vehicle controllers that can control devices such as, for example, the air conditioner, the heater, the window, the sunroof and the seat heater, which can be used to adjust the vehicle interior temperature. The interior temperature control apparatus 30 is associated with the vehicle controllers to control the vehicle interior temperature by controlling the devices systematically.

Figure 2:
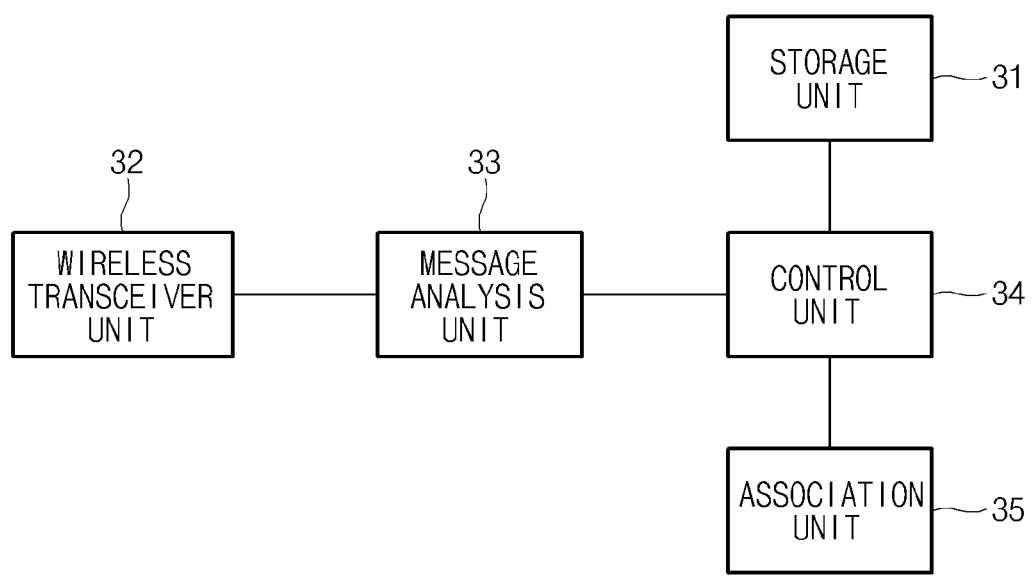
FIG. 2 is a an exemplary diagrammatic illustrating a configuration of an apparatus for controlling a vehicle interior temperature according to an exemplary embodiment of the present invention.

FIG. 2 is an exemplary diagrammatic illustrating a configuration of an apparatus for controlling a vehicle interior temperature according to an exemplary embodiment of the present invention. In this exemplary embodiment, the vehicle interior temperature control apparatus 30 includes a storage unit 31, a wireless transceiver unit 32, a message analysis unit 33, a control unit 34 and the association unit 35.

The storage unit 31 stores the temperature control table, which is used for controlling respective devices within the vehicle such as, for example, the air conditioner, the heater, the window, the sunroof and the seat heater. Below is an example of the temperature control table is shown in Table 1 below. It should be noted that a vehicle interior temperature range for each section separated into different rows in Table 1 and types of devices operating within a corresponding temperature range can vary depending on the design intent of a designer.

TABLE 1

| Section | Vehicle's Interior Temperature | Device | Function |
|---|---|---|---|
| 1 | Less than 10° C. (50° F.) | Heater, Seat Heater | Operate the heater and the seat heater up to the target temperature |
| 2 | Equal to or greater than 10° C. (50° F.) and less than 18° C. (65° F.) | Heater | Operate the heater up to the target temperature |
| 3 | Equal to or greater than 18° C. | Window, Sunroof | Open the window and the sunroof |

TABLE 1-continued

| Section | Vehicle's Interior Temperature | Device | Function |
|---|---|---|---|
| | (65° F.) and less than 25° C. (77° F.) | | |
| 4 | Equal to or Greater than 25° C. (77° F.) | Air Conditioner, Window, Sunroof | Operate the air conditioner to reach the target temperature, open the window and the sunroof for a predetermined time and close thereafter |

In Table 1, a default state is when the window and the sunroof are closed.

Hereinafter, with reference to Table 1, described is an example in an instance where the control unit 34 is associated with the vehicle controller including the engine controller 40, the air conditioning controller 50 and the body controller 60 through the association unit 35. Here, it is assumed that the vehicle interior temperature set by the user is 20° C. (68° F.).

Section 1

Initially, when the current vehicle interior temperature identified by the controller 34 is, for example, 0° C. (32° F.), section 1, of Table 1 can apply. Therefore, the controller 34 is associated with the engine controller 40, the air conditioning controller 50 and the body controller 60 through the association unit 35 to operate the heater and the seat heater until the interior temperature reaches the target temperature of 20° C. (68° F.). Typically, during the winter season there may be many days in which the interior temperature is below 0° C. (32° F.). Thus, during the winter, not only the heater but also the seat heater may be operated. Often times, during the time in which a driver commutes to work, the driver/user requests temperature control before departure.

Section 2

When the current vehicle interior temperature identified by the controller 34 is, for example, 12° C. (54° F.), section 2 can be applied to the system. Therefore, the controller 34 is associated with the engine controller 40 and the air conditioning controller 50 through the association unit 35 to operate the heater until the interior temperature reaches the target temperature of 20° C. (68° F.). For example, this section would be beneficial during the late fall or early winter when the temperature is chilly and damp, and thus may require that, the heater be operated.

Section 3

When the current vehicle interior temperature identified by the controller 34 is, for example, 22° C. (72° F.), section 3 can be applied to the system. In section 3, the vehicle is not operated and thus the heater or the air conditioner are also not operated. However, when this condition is present, the window and the sunroof are opened at a predetermined degree or distance. In this example, the controller 34 is associated with the body controller 60 through the association unit 35.

When the vehicle interior temperature is 22° (72° F.), an outside temperature is typically lower than 22° C. (72° F.) in reality, and therefore, it is possible to control the interior temperature to the user target temperature without much deviation from a user set temperature. Traditionally, a temperature range between about 18° C.~25° C. (65° F.~77° F.) is an optimal condition for human activities, and thus, a temperature control through the use of air conditioning or a heater within this temperature range is not of great utility. Additionally, the system may also be configured to prevent the window and the sunroof from being opened in rainy weather.

Section 4

When the current vehicle interior temperature identified by the controller 34 is 33° C. (92° F.), section 4 can be applied to the system. Therefore, the controller 34 is associated with the air conditioning controller 50 through the association unit 35 to operate the air conditioner until the interior temperature reaches the target temperature of 20° C. (68° F.). For example, this section would be beneficial during the summer when the temperature is hot, and thus it is efficient to operate the air conditioner along with, for example, ventilating system to remove hot air inside the vehicle outside. In this example, the window and the sunroof are opened for a predetermined period of time while the air conditioner is running and returned to a closed state after the predetermined period of time has elapsed. Additionally, on a rainy day, the window and the sunroof may be controlled not to be opened.

In the illustrated embodiments of the present invention, a temperature control message may include a vehicle start command in all of the examples except for in section 3, above. This is because the heater or the air conditioner cannot be operated unless the vehicle is started.

The wireless transceiver unit 32, when connected to the telematics server 20 through the mobile communication network, receives a temperature setting message and the temperature control message from the telematics server 20 and transmits a corresponding response message to the telematics server 20. Here, the telematics server 20 transmits the response message to the wireless internet terminal 10 so that the user may be notified of a request result.

The message analysis unit 33 determines whether the message received by the wireless transceiver unit 32 is the temperature setting message or the temperature control message by analyzing the message. When the message analyzed by the message analysis unit 33 is a temperature setting message, the control unit 34 sets the corresponding temperature as the target temperature. When the message is the temperature control message, the control unit 34 identifies the current vehicle interior temperature and communicates the temperature control message with the vehicle controller through the association unit 35 to control the vehicle interior temperature based on the temperature control table stored in the storage unit 31 until the vehicle interior temperature reaches the target temperature.

In addition, when the vehicle interior temperature reaches the target temperature, the control unit 34 may be associated with the vehicle controller through the association unit 35 to stop the operation of a corresponding device. Namely, the operation of the air conditioner, the heater or the seat heater may be stopped and the window and the sunroof may be closed.

The association unit 35 is configured to associate the control unit 34 with the vehicle controller that includes the engine controller 40, the air conditioning controller 50 and the body controller 60.

Figure 3:
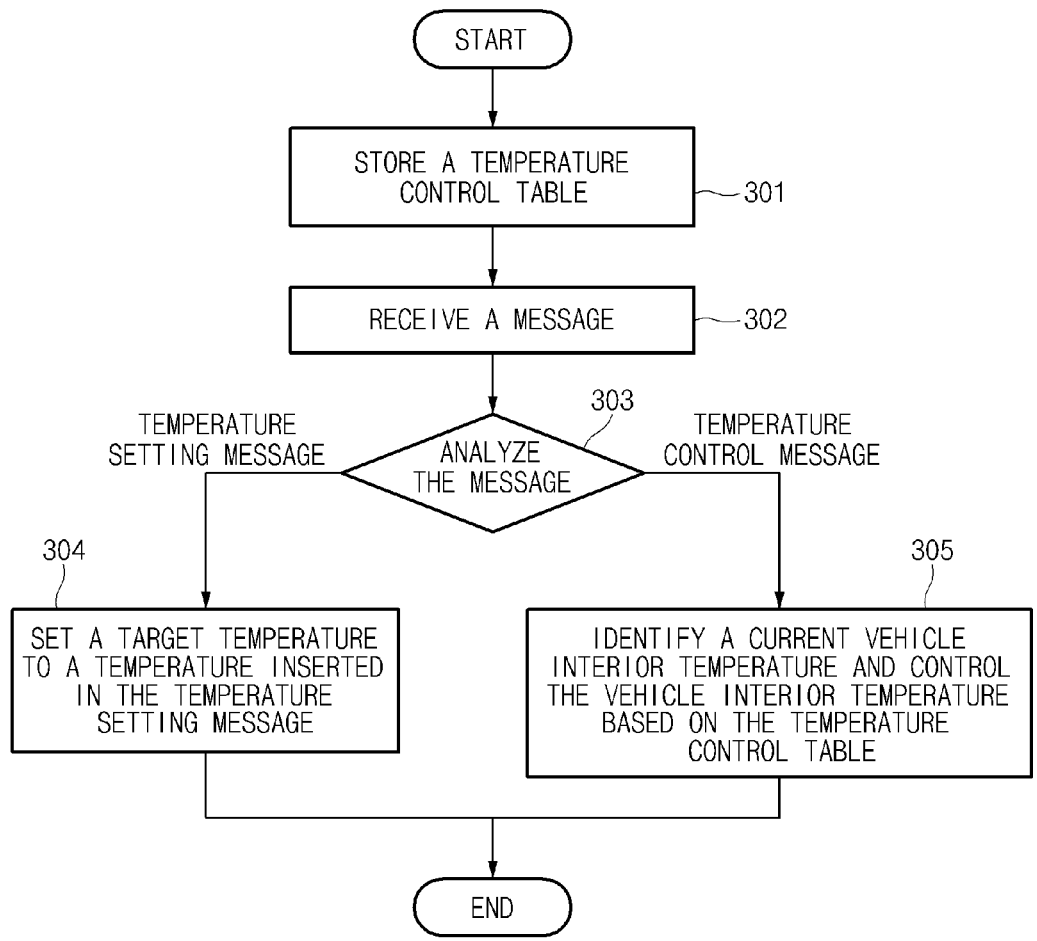
FIG. 3 is a flowchart illustrating a method of controlling a vehicle interior temperature according to an exemplary embodiment of the present invention.

FIG. 3 is a flowchart illustrating a method of controlling a vehicle interior temperature according to an exemplary embodiment of the present invention.

Initially, the storage unit 31 stores the temperature control table used to control the vehicle's interior temperature (301). The wireless transceiver unit 32 then receives a message from the telematics server 20 (302), and the message analyzing unit 33 analyzes the received message (303).

Next, if a result of a message analysis (303) indicates that the message is a temperature setting message, the target temperature is set to the temperature requested by a subscriber in the temperature setting message (304). Such procedure may be performed by the control unit 34.

Alternatively, if the result of the message analysis (303) indicates that the message is the temperature control message, the current vehicle interior temperature is identified and the vehicle interior temperature is controlled to have the target temperature by implementing the procedures outlined on the temperature control table for the temperature identified in the cars interior, with the vehicle controller being associated with that temperature (305). Such procedure may be performed by the control unit 34.

Furthermore, the vehicle interior temperature control apparatus according to the present invention can also be applied to a service that enables remote opening/closing of a vehicle door (hereinafter, "door control service"), without encountering technical difficulties.

In more detail, the user can connect to the telematics server 20 in advance to sign up to the remote door lock/unlock service by using, for example, a smartphone. Accordingly, an application to aide the user in requesting and validating a program to lock and unlock a vehicle's doors may be downloaded and installed.

Next, when a service request is received from the smartphone, the telematics server 20 performs an authentication process and transmits a corresponding request message to the interior temperature control apparatus (preferably referred to as a door control apparatus in correspondence with the door control service being provided) according to the present invention.

The interior temperature control apparatus is then associated with the body controller 60 through the association unit 35 to perform a vehicle door lock/unlock operation and transmits a performance result to the smartphone through the telematics server 20. Advantageously, such a vehicle door control (lock/unlock) service can be used in case a driver forgets to lock the door after the vehicle is parked or wishes to locate the vehicle in a parking lot.

Also, the interior temperature control apparatus according to present invention can be applied to a service that enables remote location tracking of a vehicle (hereinafter, "location identification service"), without encountering technical difficulties.

In more detail, the user can connect to the telematics server 20 in advance to sign up to a remote vehicle location tracking service by using, for example, a smartphone. In doing so, an application to aide the user in requesting and validating the flashing of a vehicle's emergency lights and/or sounding of a horn of a vehicle may be downloaded and installed.

When a service request is received from, for example, the smartphone, the telematics server 20 performs an authentication process and transmits a corresponding request message to the interior temperature control apparatus (preferably referred to as location notifying apparatus in correspondence with the location identification service being provided) according to the present invention.

Next, the interior temperature control apparatus communicates with the body controller 60 through the association unit 35 to flash the vehicle's emergency lights or sound the horn of the vehicle and transmits a result to, e.g., the smartphone, through the telematics server 20.

Such vehicle location identification service can be used in case a driver forgets a location of his or her vehicle after the vehicle is parked in, for example, a parking lot.

Advantageously, by controlling the vehicle interior temperature in association with various controllers within the vehicle in response to the remote control signal, the vehicle interior temperature can be efficiently controlled to a user desired temperature not only in winter time but also in summer time. Additionally, rain can be detected by a rain sensor when controlling the vehicle interior temperature so that an operation of the window and the sunroof is stopped in order to keep rain from entering the vehicle. Furthermore, when controlling the vehicle interior temperature, in a temperature range that is suitable for human activities, the vehicle maybe be configured to not start and thus the air conditioner or the heater are not operated, thereby decreasing carbon dioxide emission, which is a rising global issue.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for controlling a vehicle interior temperature, the apparatus comprising:
   a controller comprising a computer processor configured to:
      store a temperature control table;
      receive a message from an external device and transmit a corresponding response message using a wireless transceiver;
      analyze the message received from the external device;
      identify a current vehicle interior temperature; and
      control an air conditioner, a heater, a window, a sunroof, and a seat heater based on the temperature control table, when the analyzed message analyzed is a temperature control message,
   wherein the temperature control table comprises a first temperature section in which the current vehicle interior temperature is less than 50° F. to control the heater and the seat heater; a second temperature section in which the current vehicle interior temperature is equal to or greater than 50° F. and less than 65° F. to control the heater; a third temperature section in which the current vehicle interior temperature is equal to or greater than 65° F. and less than 77° F. to control the window and the sunroof; and a fourth temperature section in which the current vehicle interior temperature is equal to or greater than 77° F. to control the air conditioner, the window, and the sunroof.

2. The apparatus according to claim 1, wherein, the controller is further configured to:
   set a temperature inserted in the temperature setting message as the target temperature, when the analyzed message is a temperature setting message.

3. The apparatus according to claim 1, wherein the controller is configured to receive the temperature control message from a telematics server.

4. A method of controlling a vehicle interior temperature, the method comprising:
   analyzing, by a controller comprising a computer processor, a message received from an external device;
   setting, by the controller, a corresponding temperature as a target temperature when the analyzed message is a temperature setting message;
   identifying, by the controller, a current vehicle interior temperature; and
   controlling, by the controller, an air conditioner, a heater, a window, a sunroof, and a seat heater based on a temperature control table, when the analyzed message is a temperature control message,
   wherein the temperature control table comprises a first temperature section in which the current vehicle interior temperature is less than 50° F. to control the heater and the seat heater; a second temperature section in which the current vehicle interior temperature is equal to or greater than 50° F. and less than 65° F. to control the heater; a third temperature section in which the current vehicle interior temperature is equal to or greater than 65° F. and less than 77° F. to control the window and the sunroof; and a fourth temperature section in which the current vehicle interior temperature is equal to or greater than 77° F. to control the air conditioner, the window, and the sunroof.

5. The method according to claim 4, further comprising:
receiving, by the controller, the temperature setting message and the temperature control message from a telematics server.

\* \* \* \* \*